US010932222B2

(12) United States Patent
Noma et al.

(10) Patent No.: US 10,932,222 B2
(45) Date of Patent: *Feb. 23, 2021

(54) POWER STORAGE MANAGEMENT SYSTEM, INFORMATION PROCESSING APPARATUS, POWER STORAGE APPARATUS, METHOD OF OPERATING POWER STORAGE MANAGEMENT SYSTEM, AND METHOD OF OPERATING INFORMATION PROCESSING APPARATUS

(71) Applicant: Sony Corporation, Tokyo (JP)

(72) Inventors: Hideki Noma, Kanagawa (JP); Tomoyuki Ono, Saitama (JP); Hiroshi Kawashima, Tokyo (JP); Kayoko Tanaka, Tokyo (JP); Ryoki Honjo, Kanagawa (JP); Shigeru Tajima, Kanagawa (JP); Daisuke Yamazaki, Fukushima (JP); Kazumi Sato, Fukushima (JP); Yoshihito Ishibashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,541

(22) Filed: Oct. 31, 2019

(65) Prior Publication Data

US 2020/0068524 A1     Feb. 27, 2020

Related U.S. Application Data

(60) Continuation of application No. 15/865,601, filed on Jan. 9, 2018, now Pat. No. 10,484,961, which is a
(Continued)

(30) Foreign Application Priority Data

May 26, 2010 (JP) .............................. JP2010-120921

(51) Int. Cl.
*H04W 68/00* (2009.01)
*H04W 24/00* (2009.01)
(Continued)

(52) U.S. Cl.
CPC ............ *H04W 68/00* (2013.01); *G05B 15/02* (2013.01); *G05F 1/66* (2013.01); *G06Q 20/32* (2013.01);
(Continued)

(58) Field of Classification Search
CPC ..... H04W 24/00; H04W 68/00; H04W 88/02; H04M 1/72533; H04B 1/1615;
(Continued)

(56) References Cited

U.S. PATENT DOCUMENTS

| | | |
|---|---|---|
| 5,164,761 A | 11/1992 | Isono et al. |
| 5,978,366 A | 11/1999 | Massingill et al. |

(Continued)

FOREIGN PATENT DOCUMENTS

| | | |
|---|---|---|
| CN | 1372714 A | 10/2002 |
| CN | 101615814 A | 12/2009 |

(Continued)

OTHER PUBLICATIONS

Non-Final Office Action for U.S. Appl. No. 14/726,268, dated Mar. 24, 2017, 09 pages.
(Continued)

Primary Examiner — Crystal J Barnes-Bullock
(74) Attorney, Agent, or Firm — Xsensus LLP

(57) ABSTRACT

In one example embodiment, a power storage management system includes a user terminal, a power storage apparatus and an information processing apparatus. In one example embodiment, the information processing apparatus is configured to, using a mobile communication network (e.g.,
(Continued)

Global System for Mobile Communications or the Universal Mobile Telecommunications System), communicate with the power storage apparatus.

24 Claims, 15 Drawing Sheets

Related U.S. Application Data division of application No. 14/726,268, filed on May 29, 2015, now abandoned, which is a continuation of application No. 13/115,554, filed on May 25, 2011, now Pat. No. 9,094,432.

(51) Int. Cl.
    *H04M 1/725*     (2021.01)
    *H04W 88/02*     (2009.01)
    *H04B 1/16*     (2006.01)
    *G06Q 20/32*     (2012.01)
    *H04L 29/08*     (2006.01)
    *G05B 15/02*     (2006.01)
    *G05F 1/66*     (2006.01)

(52) U.S. Cl.
    CPC ......... *H04B 1/1615* (2013.01); *H04L 67/125* (2013.01); *H04M 1/72533* (2013.01); *H04W 24/00* (2013.01); *H04W 88/02* (2013.01); *Y04S 40/18* (2018.05)

(58) Field of Classification Search
    CPC .... G06Q 20/32; G06Q 20/327; H04L 67/125; G05B 15/02; G05F 1/66; Y04S 40/18
    See application file for complete search history.

(56) References Cited

U.S. PATENT DOCUMENTS

| | | |
|---|---|---|
| 6,794,849 B2 | 9/2004 | Mori et al. |
| 6,859,650 B1 | 2/2005 | Ritter et al. |
| 6,898,499 B2 | 5/2005 | Arita et al. |
| 7,024,321 B1 | 4/2006 | Deninger et al. |
| 7,089,100 B2 | 8/2006 | Takeda et al. |
| 7,519,743 B2 | 4/2009 | Yen et al. |
| 7,551,101 B2 * | 6/2009 | Yonezawa .......... G01R 31/3646 340/815.45 |
| 7,710,285 B2 | 5/2010 | Miyajima et al. |
| 7,783,389 B2 | 8/2010 | Yamada et al. |
| 7,977,924 B2 | 7/2011 | Hedtke et al. |
| 8,026,813 B2 | 9/2011 | Saito et al. |
| 8,374,726 B2 | 2/2013 | Holindrake et al. |
| 8,565,840 B2 * | 10/2013 | Matsumura .......... H04B 7/2606 455/574 |
| 8,738,431 B2 | 5/2014 | Elliott et al. |
| 9,094,432 B2 * | 7/2015 | Noma ................... G05B 15/02 |
| 2007/0029446 A1 | 2/2007 | Mosher et al. |
| 2011/0009773 A1 | 1/2011 | Hower et al. |
| 2012/0166012 A1 | 6/2012 | Lee et al. |
| 2013/0154355 A1 | 6/2013 | An et al. |
| 2013/0158762 A1 | 6/2013 | An et al. |

FOREIGN PATENT DOCUMENTS

| | | |
|---|---|---|
| JP | 05-298217 A | 11/1993 |
| JP | 2002-354560 A | 12/2002 |
| JP | 2003-044971 A | 2/2003 |
| JP | 2004-127576 A | 4/2004 |
| JP | 2004-246759 A | 9/2004 |
| JP | 2005-109748 A | 4/2005 |
| JP | 2006-092035 A | 4/2006 |
| JP | 2006-294000 A | 10/2006 |
| JP | 2006-353023 A | 12/2006 |
| JP | 2007-166102 A | 6/2007 |

OTHER PUBLICATIONS

Notice of Allowance for U.S. Appl. No. 13/115,554, dated Mar. 24, 2015, 10 pages.
Non-Final Office Action for U.S. Appl. No. 13/115,554, dated Dec. 12, 2014, 18 pages.
Non-Final Office Action for U.S. Appl. No. 15/059,027, dated Mar. 15, 2018, 17 pages.

\* cited by examiner

FIG.5

| USER ID | REGISTERED APPLIANCE INFORMATION | | | |
|---|---|---|---|---|
| | REGISTERED APPLIANCE NAME | REGISTERED APPLIANCE ID | MANUFACTURER | APPLIANCE STATE |
| | REGISTERED APPLIANCE NAME | REGISTERED APPLIANCE ID | MANUFACTURER | APPLIANCE STATE |
| | ... | ... | ... | ... |
| USER ID | REGISTERED APPLIANCE NAME | REGISTERED APPLIANCE ID | MANUFACTURER | APPLIANCE STATE |
| | REGISTERED APPLIANCE NAME | REGISTERED APPLIANCE ID | MANUFACTURER | APPLIANCE STATE |
| | ... | ... | ... | ... |
| ... | | | | |

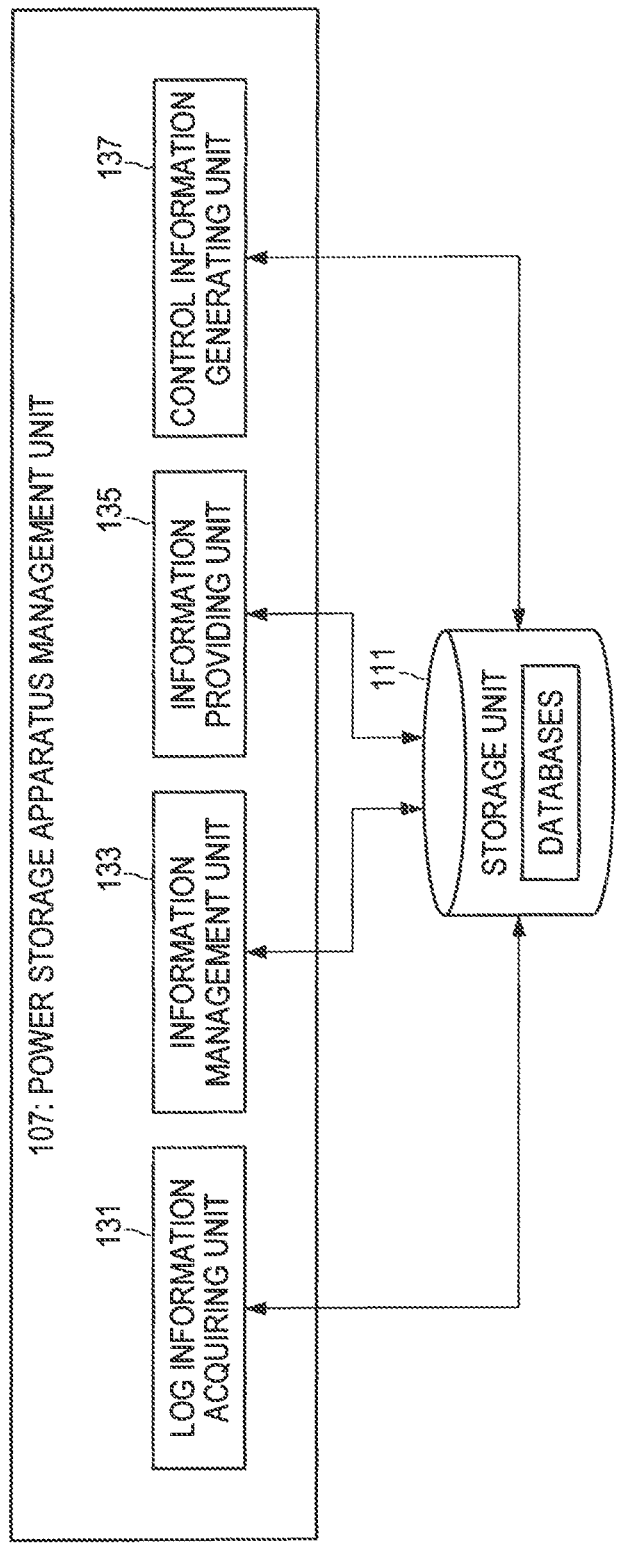

FIG.7

| LOG INFORMATION ||
|---|---|
| APPLIANCE ID | INSTALLED FUNCTION INFORMATION |
| METADATA | BATTERY FORM |
| GPS DATA | STORED POWER AMOUNT INFORMATION |
| OPERATING TIME | CHARGING VOLTAGE |
| STATE | CHARGING CURRENT |
| OPERATION MODE | ... |

FIG.10

Dioscuri Cloud

HOME | MAP | LIST | ANALYZE | RANKING | CALENDAR | USER | CAMERA | TAG | GENERAL SETTINGS

[LOG OUT] [SETTINGS]

LATEST REPORT

| ARRIVAL TIME | NAME | INSTALLED LOCATION | OPERATION TIME |
|---|---|---|---|
| 2010/06/02 14:02 | Dioscuri1 | MOTOMIYA, MOTOMIYA CITY, FUKUSHIMA | 352 |
| 2010/06/02 14:01 | Dioscuri2 | HIGASHI GOTANDA, SHINAGAWA, TOKYO | 320 |
| 2010/06/02 14:00 | Dioscuri9 | ACCRA, GHANA | 155 |
| 2010/06/02 13:55 | Dioscuri12 | SAN JOSE, CA, USA | 120 |

LATEST OPERATION REPORT

| ARRIVAL TIME | NAME | OPERATION MODE | SUPPLEMENTARY INFORMATION |
|---|---|---|---|
| 2010/06/01 23:00 | Dioscuri1 | DISCHARGE→STOP | MAXIMUM OPERATION TIME (5V 4:22) |
| 2010/06/01 21:00 | Dioscuri2 | DISCHARGE→STOP | MAXIMUM OPERATION TIME (5V 2:30) |
| 2010/06/01 19:00 | Dioscuri9 | DISCHARGE→CHARGING (200V) | CHARGING COMPLETION TIME (06/01 22:00) |
| 2010/06/01 17:00 | Dioscuri12 | CHARGING→DISCHARGE (5V 2A) | DISCHARGING COMPLETION TIME (06/01 20:00) |

NOTIFICATIONS

| ARRIVAL TIME | NAME | ITEM | CONTENT |
|---|---|---|---|
| 2010/05/30 16:40 | Dioscuri3 | BATTERY ERROR | STOPPED DUE TO BATTERY ERROR |
| 2010/05/31 20:02 | Dioscuri7 | INSTALLED LOCATION MOVED | MOTOMIYA, MOTOMIYA CITY, FUKUSHIMA →ACCRA, GHANA |

MESSAGES

LOGGED IN

BATTERIES (LIST)

WEB CAMERAS (LIST)

THUMBNAIL IMAGE    THUMBNAIL IMAGE

CONTENT (LIST)

USER  NAME
user1    Dioscuri1
(CONTENT)Dioscuri1 is...

USER  NAME
user3    Dioscuri5
(CONTENT)Maintenance complete.

FIG. 12

Dioscuri Cloud    (LOG OUT) (SETTINGS)

HOME | MAP | LIST | ANALYZE | RANKING | CALENDAR | USER | CAMERA | TAG | GENERAL SETTINGS

LIST VIEW

[          ] (SEARCH)

<< PREVIOUS 1 2 3 4 5 6 ... 150 151 NEXT >>

| NAME | INSTALLED LOCATION | OPERATION TIME | BATTERY FORM | OPERATION MODE | INSTALLED FUNCTION | STATE | COMMENT |
|---|---|---|---|---|---|---|---|
| Dioscuri1 | MOTOMIYA, MOTOMIYA CITY, FUKUSHIMA | 352 | Dioscuri I | Idle | | NORMAL | 15 |
| Dioscuri2 | HIGASHI GOTANDA, SHINAGAWA, TOKYO | 320 | Dioscuri I | Idle | | NORMAL | 3 |
| Dioscuri9 | ACCRA, GHANA | 155 | Dioscuri II | CHARGING | WEB CAMERA | NORMAL | 10 |
| Dioscuri12 | SAN JOSE, CA, USA | 120 | Dioscuri II | CHARGING | WEB CAMERA | NORMAL | 20 |

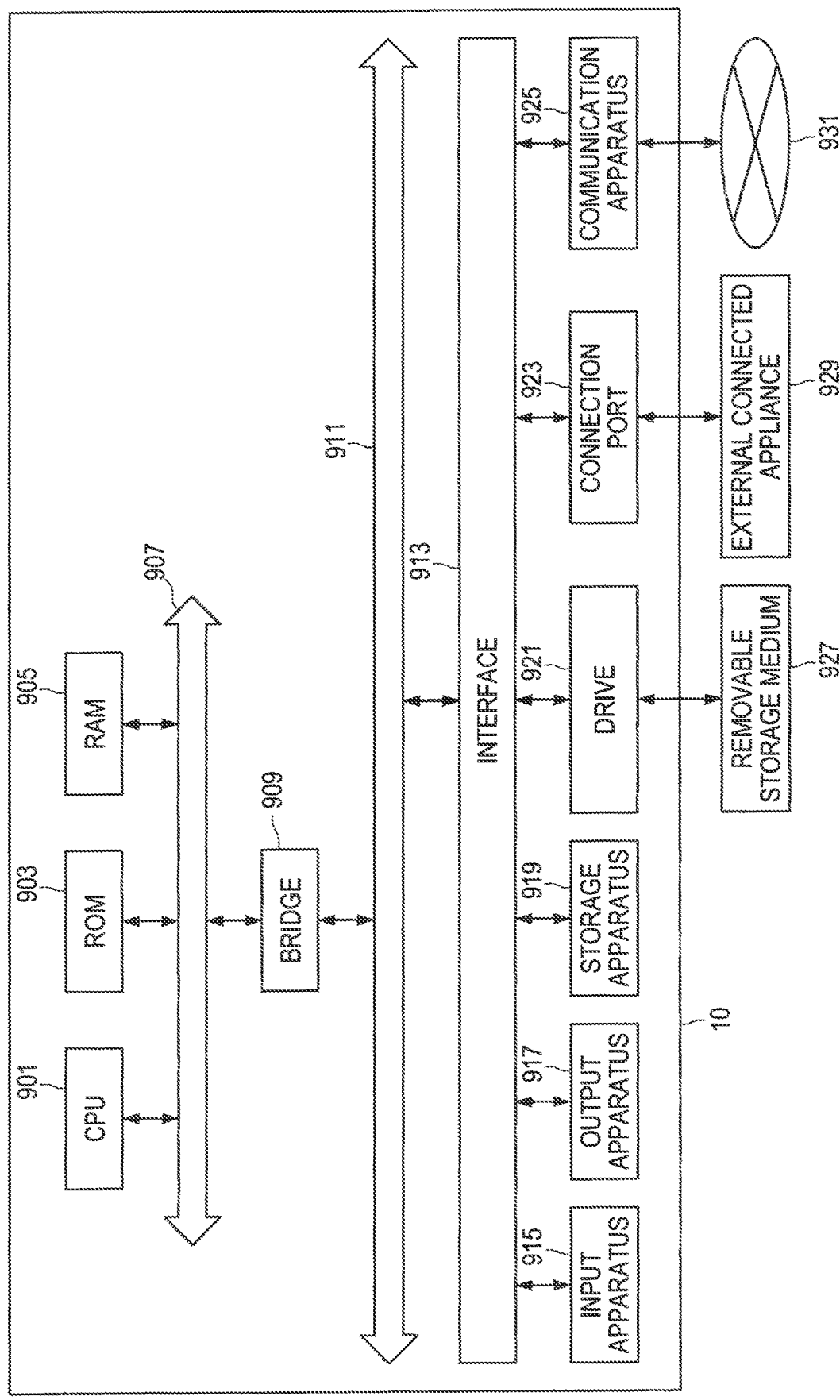

POWER STORAGE MANAGEMENT SYSTEM, INFORMATION PROCESSING APPARATUS, POWER STORAGE APPARATUS, METHOD OF OPERATING POWER STORAGE MANAGEMENT SYSTEM, AND METHOD OF OPERATING INFORMATION PROCESSING APPARATUS

CROSS-REFERENCE TO RELATED APPLICATIONS

The present application is a continuation of U.S. patent application Ser. No. 15/865,601, filed Jan. 9, 2018, which is a divisional of U.S. patent application Ser. No. 14/726,268, filed May 29, 2015, which claims priority from U.S. patent application Ser. No. 13/115,554 (now U.S. Pat. No. 9,094,432), filed on May 25, 2011, and claims the benefit of priority from prior Japanese Patent Application JP 2010-120921, filed May 26, 2010. Each of the above referenced applications is hereby incorporated by reference in its entirety.

BACKGROUND

In recent years, a technology called smart grid has been gaining attention. The smart grid is a technological framework to realize efficient power usage by constructing a new transmission network having a communication channel along with the transmission network and using this intelligent transmission network. The background idea of the smart grid is to realize efficient management of the amount of power use, swift handling of an incident when such an incident occurs, remote control of the amount of power use, distributed power generation using power generation facilities outside the control of a power company, or charging management of an electric vehicle. Particularly, effective utilization of in-house power generating stations using renewable energy by ordinary households or operators other than power companies and charging management of various electric vehicles typically including electric cars have been attracting considerable attention. Incidentally, renewable energy is energy generated without using fossil fuel.

Power generated by ordinary households or operators other than power companies is used by power generation operators. Remaining power after use by the power generation operators is currently purchased by power companies. However, purchasing power supplied from power generation facilities outside the control of a power company is a heavy burden to the power company. For example, amount of power supplied from photovoltaic power generation facilities depends on the weather. Moreover, amount of power supplied from in-house power generating stations of ordinary households depends on power use of ordinary households that largely changes day by day. Thus, it is difficult for power companies to receive stable power supply from power generation facilities outside the control of power companies. For the above reason, it may become difficult for power companies to purchase power in the future.

Thus, a home battery initiative that uses power generated by power generation facilities outside the control of power companies after temporarily storing the power in batteries has recently been gaining attention. For example, a method of using power generated by photovoltaic power generation facilities by storing such power in batteries and making up for shortages in the night or when the weather is bad is considered. Furthermore, a method of limiting amount of power received from a power company in accordance with the battery storage amount or using power stored in batteries in the daytime when power rates are higher by storing power, in batteries, supplied by a power company in the night when power rates are lower are considered. Also, batteries can store power as DC, which makes DC/AC conversion or AC/DC conversion during transmission unnecessary so that losses during conversion can be reduced.

Thus, various expectations regarding power management mingle with one another amid the smart grid initiative. To realize such power management, the smart grid initiative is premised on having a communication channel along with a transmission network. That is, exchanging information about power management by using this intelligent transmission network is assumed (see JP-A-2002-354560, for example). However, in a region where a communication infrastructure is already built, instead of using a transmission network as a communication channel, information about power management may be exchanged by using a network constructed by the deployed communication infrastructure. That is, what is important in the smart grid initiative is how to efficiently manage power generation facilities and storage facilities that are not uniformly managed.

In the smart grid initiative described above, it is extremely important to efficiently gather a variety of information including the power storage states of power storage apparatuses and to provide the gathered information to the user in an easily comprehendible manner. However, a method of doing so is yet to be proposed.

SUMMARY

In light of the foregoing, it is desirable to provide an information processing apparatus, an information processing method, a program, and a power storage apparatus management system which are capable of efficiently gathering a variety of information including the power storage states of power storage apparatuses and providing the gathered information to the user in an easily comprehendible manner.

In one example embodiment, a power storage management system includes a user terminal (e.g., a mobile telephone), a power storage apparatus and an information processing apparatus configured to, using a mobile communication network (e.g., the Global System for Mobile Communications or the Universal Mobile Telecommunications System), communicate with the power storage apparatus.

In one example embodiment, the power storage apparatus is configured to: (a) acquire power from at least one of a power generating apparatus and a power supplying network; and (b) supply the power to an appliance.

In one example embodiment, the power generating apparatus includes one of a photovoltaic power generating device, a wind power generating device, a geothermal power generating device, a hydroelectric power generating device and a wave powering generating device.

In one example embodiment, the user terminal is configured to, using the Internet, communicate with the information processing apparatus.

In one example embodiment, the power storage apparatus includes: (i) first information indicative of a position of the power storage apparatus; and (ii) second information indicative of an operation state of the power storage apparatus. In one example embodiment, the information processing apparatus is configured to, using the mobile communication network, acquire the first information and the second information from the power storage apparatus.

In one example embodiment, the power storage apparatus includes power storage apparatus information. In one example embodiment, the information processing apparatus is configured to, using time/date information, manage the power storage apparatus information. In one example embodiment, the information processing apparatus is configured to, in response to a request from the user terminal, provide the power storage apparatus information to the user terminal.

In one example embodiment, at a first point in time, the power storage apparatus includes first power storage apparatus information, and at a second, later point in time, the power storage apparatus includes second power storage apparatus information. In one example embodiment, the power storage apparatus is configured to, in response to a predetermined amount of time being passed since the power storage apparatus transmitted the first power storage information to the information processing apparatus, transmit the second power storage apparatus information to the information processing apparatus.

In one example embodiment, the power storage apparatus includes power storage apparatus information. In one example embodiment, the power storage apparatus has an operation state. In one example embodiment, the power storage apparatus is configured to, in response to a change in the operation state, transmit the power storage apparatus information to the information processing apparatus.

In one example embodiment, the power storage apparatus includes power storage apparatus information. In one example embodiment, the power storage apparatus is configured to: (i) determine whether a specific situation has occurred; and (ii) in response to the determination being that the specific situation occurred, transmit the power storage apparatus information to the information processing apparatus.

In one example embodiment, an information processing apparatus includes a processor and a memory device storing instructions which when executed by the processor, cause the processor to, using a mobile communication network (e.g., the Global System for Mobile Communications or the Universal Mobile Telecommunications System), communicate with a power storage apparatus.

In one example embodiment, the instructions, when executed by the processor, cause the processor to, using the Internet, communicate with a user terminal.

In one example embodiment, the power storage apparatus includes: (i) first information indicative of a position of a power storage apparatus; and (ii) second information indicative of an operation state of the power storage apparatus. In one example embodiment, the instructions, when executed by the processor, cause the processor to, using the mobile communication network, acquire the first information and the second information from the power storage apparatus.

In one example embodiment, the power storage apparatus includes power storage apparatus information. In one example embodiment, the instructions, when executed by the processor, cause the processor to, using time/date information, manage the power storage apparatus information. In one example embodiment, the instructions, when executed by the processor, cause the processor to, in response to a request from a user terminal, provide the power storage apparatus information to the user terminal.

In one example embodiment, a power storage apparatus includes a processor and a memory device storing instructions which when executed by the processor, cause the processor to, using a mobile communication network (e.g., the Global System for Mobile Communications or the Universal Mobile Telecommunications System), communicate with an information processing apparatus.

In one example embodiment, the instructions, when executed by the processor, cause the processor to: (a) acquire power from at least one of a power generating apparatus and a power supplying network; and (b) supply the power to an appliance.

In one example embodiment, at a first point in time, the power storage apparatus includes first power storage apparatus information. In one example embodiment, at a second, later point in time, the power storage apparatus includes second power storage apparatus information. In one example embodiment, the instructions, when executed by the processor, cause the processor to, in response to a predetermined amount of time being passed since the power storage apparatus transmitted the first power storage information to the information processing apparatus, transmit the second power storage apparatus information to the information processing apparatus.

In one example embodiment, the power storage apparatus includes power storage apparatus information. In one example embodiment, the power storage apparatus has an operation state. In one example embodiment, the instructions, when executed by the processor, cause the processor to, in response to a change in the operation state, transmit the power storage apparatus information to the information processing apparatus.

In one example embodiment, the power storage apparatus includes power storage apparatus information. In one example embodiment, the instructions, when executed by the processor, cause the processor to: (i) determine whether a specific situation has occurred; and (ii) in response to the determination being that the specific situation occurred, transmit the power storage apparatus information to the information processing apparatus.

In one example embodiment, a method of operating a power storage management system (which includes a user terminal, a power storage apparatus and an information processing apparatus) includes causing the information processing apparatus to, using a mobile communication network, communicate with a power storage apparatus.

In one example embodiment, a method of operating an information processing apparatus (which includes instructions) includes causing a processor to execute the instructions to, using a mobile communication network, communicate with a power storage apparatus.

In one example embodiment, a method of operating a power storage apparatus (which includes instructions) includes causing a processor to execute the instructions to, using a mobile communication network, communicate with an information processing apparatus.

According to the example embodiments of the present disclosure described above, it is possible to efficiently gather a variety of information including the power storage states of power storage apparatuses and to provide the gathered information to the user in an easily comprehendible manner.

Additional features and advantages are described herein, and will be apparent from the following Detailed Description and the figures.

BRIEF DESCRIPTION OF THE FIGURES

FIG. 5 is a diagram illustrating an example of items in registered appliance information.

FIG. 6 is a block diagram illustrating the configuration of a power storage apparatus management unit according to the same example embodiment.

FIG. 7 is a diagram illustrating an example of items in log information.

FIG. 10 is a diagram illustrating an example of an information providing screen according to the same example embodiment.

FIG. 12 is a diagram illustrating another example of an information providing screen according to the same example embodiment.

FIG. 16 is a block diagram illustrating the hardware configuration of an information processing apparatus according to an example embodiment of the present disclosure.

DETAILED DESCRIPTION OF THE EMBODIMENT(S)

Figure 1:
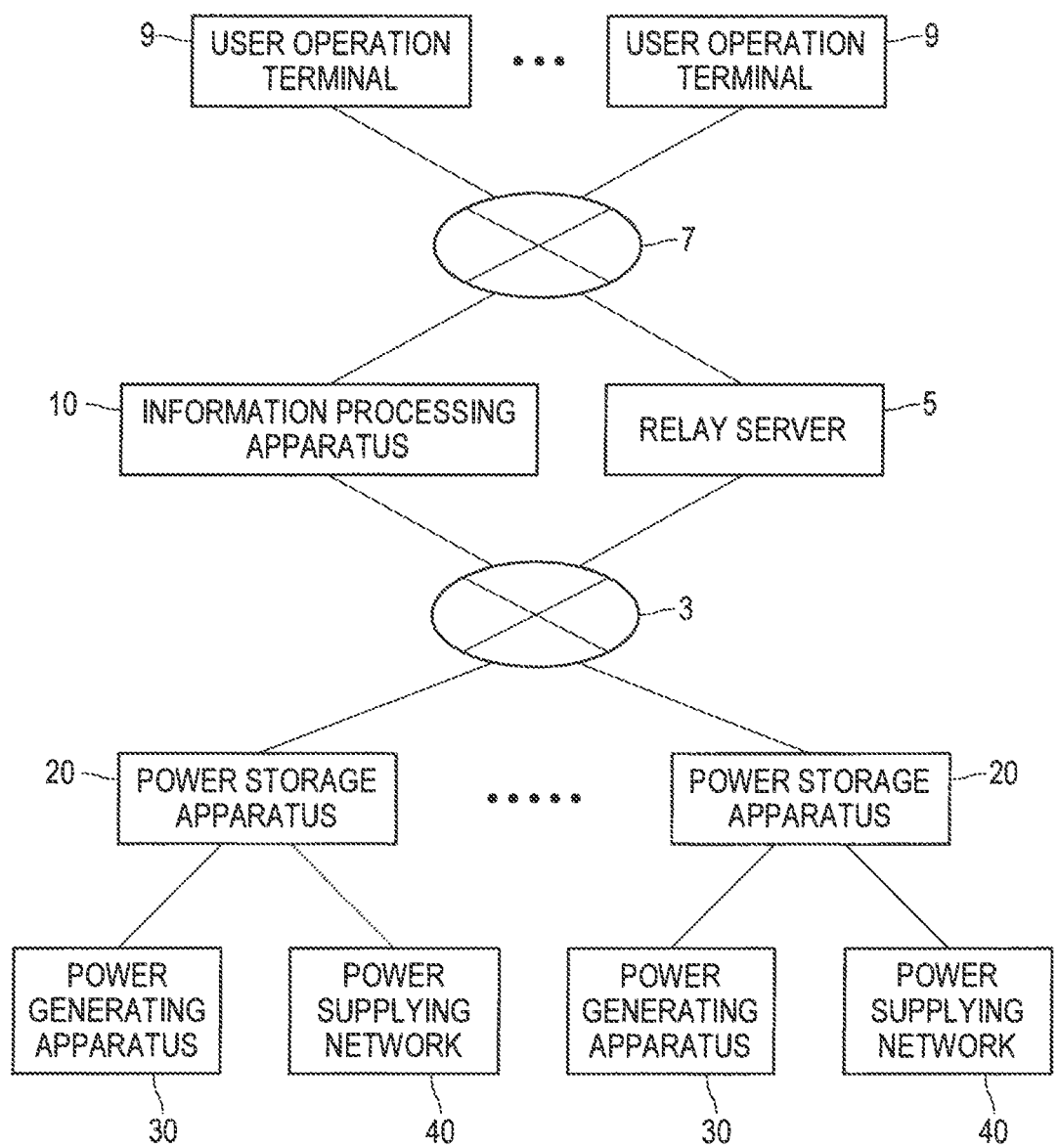
FIG. 1 is a diagram illustrating the configuration of a power storage apparatus management system according to a first example embodiment of the present disclosure.

Hereinafter, preferred example embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
(1) First Example Embodiment
(1-1) Configuration of Power Storage Apparatus Management System
(1-2) Configuration of Information Processing Apparatus
(1-3) Configuration of Power Storage Apparatus
(1-4) Information Processing Method
(1-5) Examples of Information Providing Screens
(2) Hardware Configuration of Information Processing Apparatus Example embodiment of the Present Disclosure (1) First Example Embodiment (1-1) Configuration of Power Storage Apparatus Management System First, the configuration of a power storage apparatus management system according to a first example embodiment of the present disclosure will be described with reference to FIG. 1. FIG. 1 is a diagram useful in showing the configuration of a power storage apparatus management system according to the present example embodiment.

As shown in FIG. 1, the power storage apparatus management system 1 according to the present example embodiment includes an information processing apparatus 10 and one or a plurality of power storage apparatuses 20 that are connected to one another by a mobile communication network 3. Mobile communication carried out between the information processing apparatus 10 and a power storage apparatus 20 may also be relayed by a relay server 5. The information processing apparatus 10 is also capable of communicating via a communication network 7 with user operation terminals 9 that are owned by users.

The various elements included in the power storage apparatus management system 1 according to the present example embodiment will now be described in brief.

The mobile communication network 3 is a digital mobile telephone communication network that connects the information processing apparatus 10 and the power storage apparatuses 20 according to the present example embodiment so as to be capable of communicating with one another via mobile communication. Although there are no particular limitations on the communication method used on such digital mobile telephone communication network, it is preferable to set the method in accordance with the communication environment of the region in which the power storage apparatus management system 1 is installed.

As one example, when the power storage apparatus management system 1 according to the present example embodiment is set up across the globe, it is preferable to use a digital mobile telephone communication network that is capable of being used in any country or region of the world. Here, GSM (Global System for Mobile communications) can be given as one example of such a digital mobile telephone communication network.

It is also possible to use so-called "3G" (third generation) digital mobile communication technologies that have a high communication speed and make very efficient use of bandwidth when the power storage apparatus management system 1 according to the present example embodiment is set up in a country or region where 3G communication is available.

The relay server 5 is a server that relays communication carried out between the information processing apparatus 10 and a power storage apparatus 20 via the mobile communication network 3. Here, a server owned by the electrical communication operator that provides the mobile communication network 3 can be given as one example of the relay server 5. As necessary, the relay server 5 may also be provided as appropriate in the power storage apparatus management system 1 according to the present example embodiment.

The communication network 7 is a communication network that connects a variety of user operation terminals 9 owned by users and the information processing apparatus 10 according to the present example embodiment so as to be capable of two-way communication. As examples, the communication network 7 may be constructed of a dedicated network such as the Internet, a telephone network, a satellite communication network, a public network such as a broadcast communication channel, a WAN (Wide Area Network), a LAN (Local Area Network), an IP-VPN (Internet Protocol-Virtual Private Network), an Ethernet (registered trademark), or a wireless LAN, and may be wired or wireless. The relay server 5 described above may also be connected to such communication network.

The user operation terminals 9 are various types of information terminal owned by users who use the power storage apparatus management system 1 according to the present example embodiment. Here, a personal computer, a television set, various types of recorder such as a DVD recorder or a Blu-Ray recorder, a car navigation system, and intelligent home appliances can be given as examples of information terminals. Other examples of the user operation terminals 9 include various types of communication appliance such as a mobile telephone, a PDA, or a so-called "smart phone", a content playback appliance such as a mobile music player, and a mobile information terminal equipped with a touch panel or the like.

By operating the various types of operation terminals given above and connecting to the information processing apparatus 10 according to the present example embodiment, the user is able to view various information relating to the power storage apparatuses 20 registered in the system 1. By operating the various types of operation terminals given above, the user is also able to carry out operation control over a specified power storage apparatus 20 via the information processing apparatus 10 according to the present example embodiment.

The information processing apparatus 10 acquires and manages log information expressing operation states of the power storage apparatuses 20 that has been transmitted from the power storage apparatuses 20 and, in accordance with requests from the user operation terminals 9, provides various information relating to the power storage apparatuses that are being managed to the user operation terminals 9. In other words, the information processing apparatus 10 according to the present example embodiment can be thought of as a power storage apparatus management server that manages the power storage apparatuses 20 and also as an information providing server that provides information relating to the power storage apparatuses 20 to the user operation terminals 9.

The information processing apparatus 10 is also capable of providing various information relating to the power storage apparatuses 20 being managed to various servers, such as a search server or an information providing server, that are connected to the communication network 7. It is also possible for a search server, an information providing server, or the like that is connected to the communication network 7 to be equipped with the functions of the information processing apparatus 10 according to the present example embodiment.

The configuration of the information processing apparatus 10 according to the present example embodiment will now be described again in more detail.

A power storage apparatus 20 is an apparatus that is equipped with a battery and is capable of storing power acquired from a power generating apparatus 30 or a power supplying network 40 and supplying stored power to various appliances that use power. The power storage apparatus 20 is also capable when excess power is held to sell such excess power via a power supplying network 40 to a power supplying company.

Each power storage apparatus 20 according to the present example embodiment has a function that is capable of carrying out communication using the mobile communication network 3. Each power storage apparatus 20 according to the present example embodiment is also capable of acquiring data such as GCA and RMC outputted from a GPS (Global Positioning System) and specifying the installed position at which such apparatus is installed. As described below, each power storage apparatus 20 according to the present example embodiment transmits log information including GPS data and various information showing the state of the power storage apparatus 20 via the mobile communication network 3 to the information processing apparatus 10 according to the present example embodiment.

The configuration of a power storage apparatus 20 according to the present example embodiment will now be described.

The power generating apparatus 30 is a power generating device that generates power using renewable energy. Here, a photovoltaic power generating device, a wind power generating device, a geothermal power generating device, a hydroelectric power generating device, a wave power generating device, and the like can be given as examples of a power generating device that generates power using renewable energy. The power generating apparatus 30 may be a power generating device that generates electricity using non-renewable energy that has a lower environmental footprint than thermal power generation or the like where gasoline, coal, or the like is burned to generate power. Here, a fuel cell, a natural gas-driven generating device, a biomass power generating device and the like can be given as examples of such a power generating device.

A power supplying network 40 is power supplying equipment that supplies power generated by equipment owned by a power supplying company.

This completes the overall description of the configuration of the power storage apparatus management system 1 according to the present example embodiment.

(1-2) Configuration of Information Processing Apparatus

Figure 2:
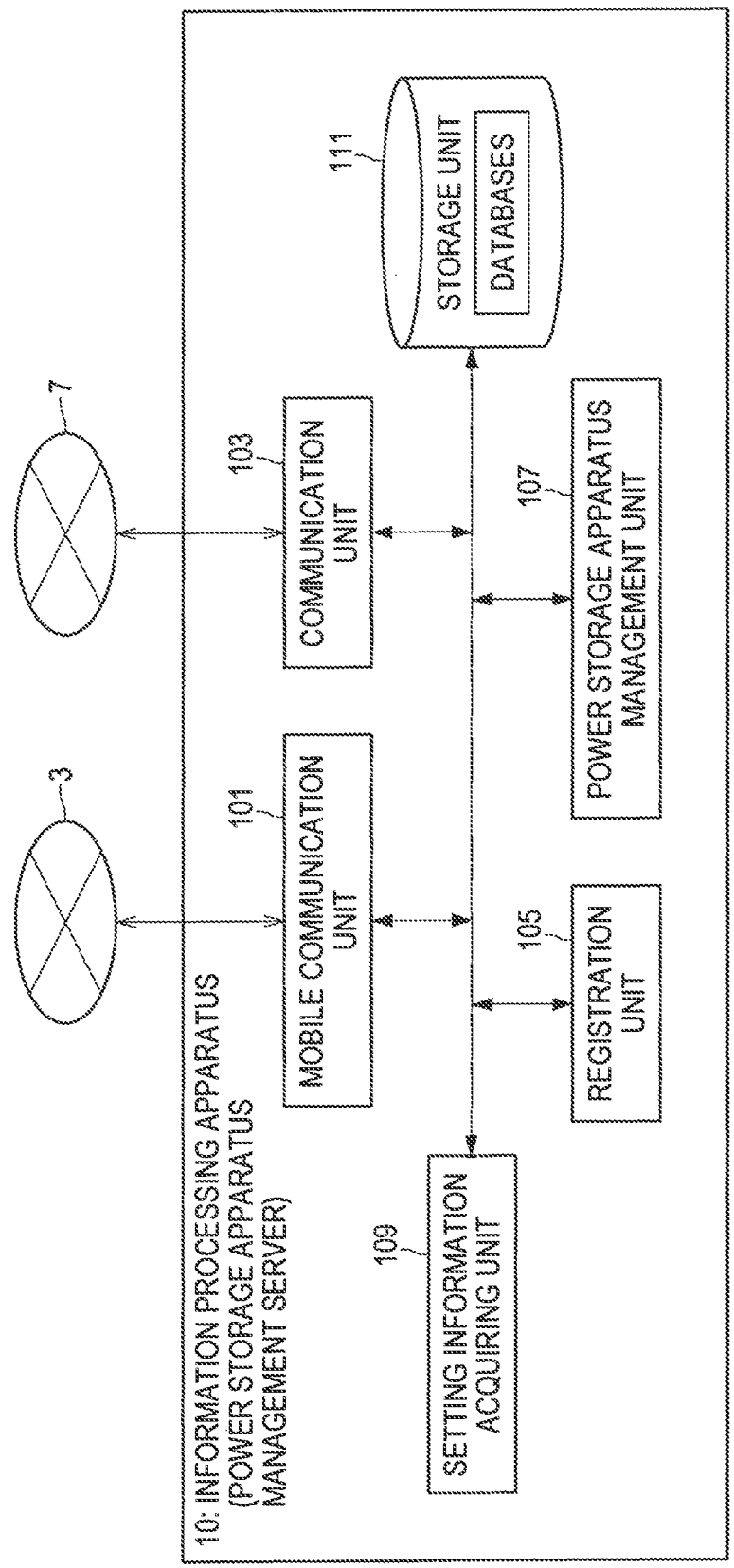
FIG. 2 is a block diagram illustrating the configuration of an information processing apparatus according to the same example embodiment.

Next, the configuration of the information processing apparatus 10 according to the present example embodiment will be described in detail with reference to FIGS. 2 to 7. First, the overall configuration of the information processing apparatus 10 according to the present example embodiment will be described with reference to FIG. 2. FIG. 2 is a block diagram showing the configuration of the information processing apparatus 10 according to the present example embodiment.

As shown in FIG. 2, the information processing apparatus 10 according to the present example embodiment mainly includes a mobile communication unit 101, a communication unit 103, a registration unit 105, a power storage apparatus management unit 107, a setting information acquiring unit 109, and a storage unit 111.

The mobile communication unit 101 is realized by a CPU (Central Processing Unit), a ROM (Read Only Memory), a RAM (Random Access Memory), a modem for communicating with the mobile communication network 3, and the like. The mobile communication unit 101 controls the communication carried out between the information processing apparatus 10 and a power storage apparatus 20 via the mobile communication network 3. When the processing units provided in the information processing apparatus 10 according to the present example embodiment exchange information with a power storage apparatus 20, the transmitting and receiving of such information is carried out via the mobile communication unit 101.

As one example, the communication unit 103 is realized by a CPU, a ROM, a RAM, a communication apparatus, and the like. The communication unit 103 controls communication carried out between the information processing apparatus 10 and a user operation terminal 9 via the communication network 7. When the processing units provided in the information processing apparatus 10 according to the present example embodiment exchange information with a user operation terminal 9, the transmitting and receiving of such information is carried out via the communication unit 103. Also, when the processing units of the information processing apparatus 10 transmit and receive information via the communication network 7 such as the Internet to or from another apparatus such as various servers connected to the communication network 7, the transmitting and receiving of such information is carried out via the communication unit 103.

As one example, the registration unit 105 is realized by a CPU, a ROM, a RAM, and the like. The registration unit 105 registers users who make use of the management function for power storage apparatuses 20 provided by the information processing apparatus 10 according to the present disclosure and the power storage apparatuses 20 themselves owned by such users.

Figure 3:
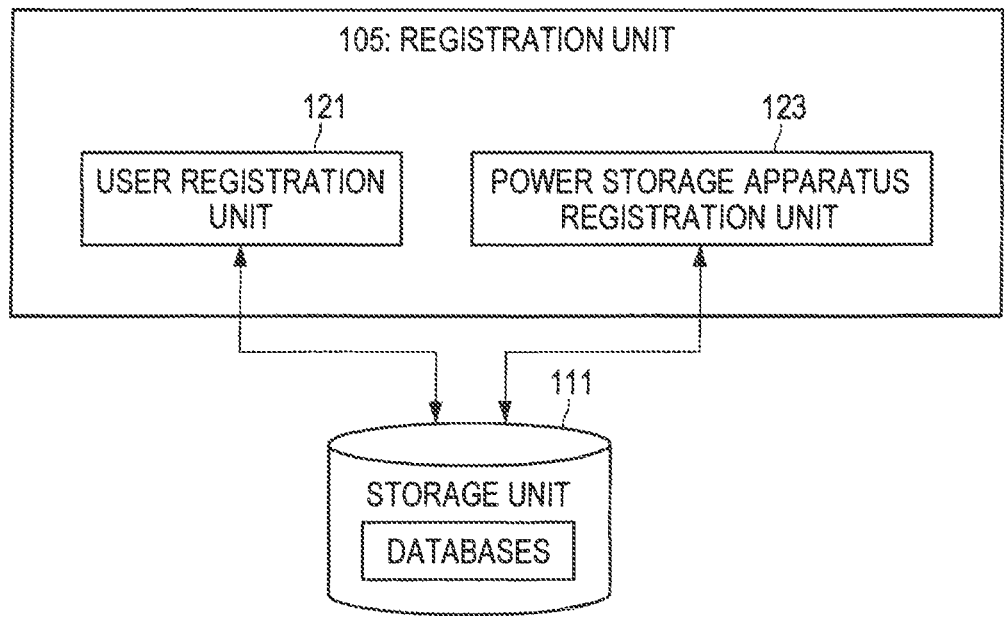
FIG. 3 is a block diagram illustrating the configuration of a registration unit according to the same example embodiment.

FIG. 3 is a block diagram showing the configuration of the registration unit 105 according to the present example embodiment. As shown in FIG. 3, the registration unit 105 includes a user registration unit 121 and a power storage apparatus registration unit 123.

As one example, the user registration unit 121 is realized by a CPU, a ROM, a RAM, and the like. When a user has operated a user operation terminal 9 to make a request to the information processing apparatus 10 to join a management service for a power storage apparatus 20, the user registration unit 121 registers information relating to the user in question in a database stored in the storage unit 111, described later. At this time, the user registration unit 121 assigns a unique user ID to the user and manages various information (hereinafter referred to as "user information") relating to the user.

Figure 4:
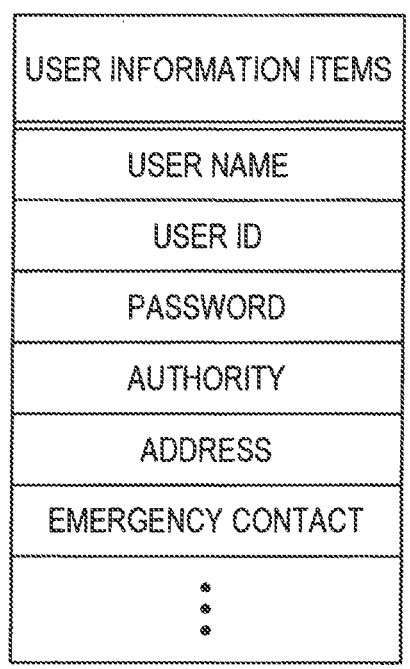
FIG. 4 is a diagram illustrating an example of items in user information.

FIG. 4 is a diagram useful in explaining one example of the content registered by the user registration unit 121 as user information in a database in the storage unit 111. As shown in FIG. 4, the user registration unit 121 registers a user name, a user ID, a password, address information relating to the e-mail address and/or residence of the user, emergency contact information, and the like as the user information. The user registration unit 121 is also capable of writing information relating to what authority has been given to each user as the user information. By doing so, it is possible for the various processing units provided in the information processing apparatus 10 according to the present example embodiment to easily grasp what authority, i.e., what types of processing can be executed for which power storage apparatuses, has been given to each user. Note that the items in the user information shown in FIG. 4 are mere examples and that it is possible for one or more of the items shown in FIG. 4 to be omitted and for information aside from the information shown in FIG. 4 to be registered as user information.

Note that when user registration is carried out, the user registration unit 121 may use a known encryption technique, digital signature technique, or the like to issue various data, such as an encryption key or a digital signature for ensuring the validity of a user, to a user operation terminal 9 owned by the user.

Also, if the information processing apparatus 10 according to the present example embodiment is capable of connecting to a public server such as a search server connected to the communication network 7, it is also possible for user information registered in the public server to be used as the user information of the information processing apparatus 10 according to the present example embodiment.

As one example, the power storage apparatus registration unit 123 is realized by a CPU, a ROM, a RAM, and the like. When there is a power storage apparatus 20 that has been newly connected to the power storage apparatus management system 1 according to the present example embodiment, the power storage apparatus registration unit 123 registers information relating to such power storage apparatus 20 in a database stored in the storage unit 111, described later. When doing so, the power storage apparatus registration unit 123 assigns a unique ID to each power storage apparatus and manages various information (hereinafter referred to as "registered appliance information" relating to the power storage apparatus.

Although there are no particular limitations on the flow by which the power storage apparatus registration unit 123 registers a power storage apparatus 20 that has been newly connected to the system, as one example the power storage apparatus registration unit 123 may register a power storage apparatus 20 using the flow described below. One example of the flow of a registration process for a power storage apparatus will now be described in brief with reference to FIG. 5. FIG. 5 is a diagram useful in showing one example of the registered appliance information. When a new power storage apparatus 20 is connected to the power storage apparatus management system 1 according to the present example embodiment, the connected power storage apparatus 20 transmits registration information including at least the information listed below via the mobile communication network 3 to the information processing apparatus 10.

GPS data showing the installed position of the power storage apparatus 20 metadata relating to the power storage apparatus 20 itself (for example, information that characterizes the power storage apparatus 20, such as the model number/name, manufacturer name, and installed function names)

When the registration information described above has been acquired via the mobile communication unit 101, the power storage apparatus registration unit 123 registers the acquired registration information in the database as registered appliance information. Also, by carrying out an action such as separately transmitting a message to user operation terminals 9, the power storage apparatus registration unit 123 associates the power storage apparatus 20 that has been newly connected to the system with a user. By doing so, registered appliance information such as that shown in FIG. 5 is generated.

In the registered appliance information shown in FIG. 5, various information relating to each power storage apparatus 20 that has been associated with a particular user ID is given for each user ID. In the registered appliance information shown in FIG. 5, information relating to the registered appliance name, registered appliance ID, manufacturer, appliance state, and the like is registered as the information relating to a power storage apparatus 20. Here, position information relating to the installed position of the power storage apparatus 20, and information that reflects power storage apparatus information including operation setting information and/or operation state information of the power storage apparatus 20 is registered as the information relating to the appliance state. When log information expressing the operation state and the like of a power storage apparatus 20 is transmitted from such power storage apparatus 20, the content of the information relating to the appliance state in the database is updated in accordance with the content of the log information.

Note that although the registered appliance information shown in FIG. 5 is given in a format where the power storage apparatuses 20 are associated with respective user IDs, the registered appliance information for the present example embodiment is not limited to this example. As another example, in the registered appliance information for the present example embodiment, user IDs relating to users who own (or manage) the respective power storage apparatuses may be given for each power storage apparatus.

Note that when a new power storage apparatus 20 has been registered, the power storage apparatus registration unit 123 may use a known encryption technique, digital signature technique, or the like to issue various data, such as an encryption key or a digital signature for ensuring the validity of a power storage apparatus, to the power storage apparatus 20 that has been newly registered.

This completes the description of the registration unit 105 according to the present example embodiment. The explanation will now return to FIG. 2 and describe the power storage apparatus management unit 107 provided in the information processing apparatus 10 according to the present example embodiment in detail.

As one example, the power storage apparatus management unit 107 is realized by a CPU, a ROM, a RAM, and the like. The power storage apparatus management unit 107 is a processing unit that manages the power storage apparatuses 20 based on various information acquired from the power storage apparatuses 20 via the mobile communication network 3. In other words, the power storage apparatus management unit 107 is a processing unit for realizing various functions in order to manage the power storage apparatuses 20 registered in the information processing apparatus 10.

FIG. 6 is a block diagram showing the configuration of the power storage apparatus management unit 107 according to the present example embodiment. As shown in FIG. 6, the power storage apparatus management unit 107 according to the present example embodiment further includes a log information acquiring unit 131, an information management unit 133, an information providing unit 135, and a control information generating unit 137.

As one example, the log information acquiring unit 131 that is one example of an information acquiring unit is realized by a CPU, a ROM, a RAM, and the like. The log information acquiring unit 131 acquires power storage apparatus information that was transmitted from a power storage apparatus and received by the mobile communication unit 101. Such power storage apparatus information is the log information showing the installed position and operation state of a power storage apparatus 20 over lime. As one example, such log information is transmitted to the information processing apparatus 10 with the timing described below by communication via the mobile communication network 3 that has been established from the power storage apparatus 20 side.

timing at which the log information is transmitted (aside from when newly connecting to the system)

whenever a specified period passes, such as one hour, one day, one week, or one month whenever the operation mode (such as power storing mode, discharging mode, and a stopped state) of the power storage apparatus changes whenever an unexpected situation arises (for example, when there has been an unforeseen change in the position information or an emergency situation such as a battery failure)

In addition to the situations described above, log information may be transmitted from a power storage apparatus 20 to the information processing apparatus 10 in the situations listed below.

when the user has issued a short message or made a telephone call to the power storage apparatus 20 via the mobile communication network 3 when a short message has been issued or a telephone call has been made via the mobile communication network 3 to a power storage apparatus 20 from a modem or the like provided in the information processing apparatus 10 when the information processing apparatus 10 has issued an e-mail message or the like via the communication network 7 to the relay server 5

One example of the power storage apparatus information (hereinafter also referred to as "log information") transmitted from a power storage apparatus 20 is shown in FIG. 7. FIG. 7 is a diagram useful in showing one example of the log information. As shown in FIG. 7, the appliance ID of the power storage apparatus, various metadata that characterizes the power storage apparatus. GPS data expressing the installed position, an operating time, an operation state, an operation mode, information on the installed functions, and the like are included in the log information transmitted from the power storage apparatus 20. Aside from such information, the log information may include a battery form, information relating to the stored amount of power, information relating to the charging voltage, charging current, and the like, and information relating to various settings of the power storage apparatus 20. Note that the items in the log information illustrated in FIG. 7 are mere examples and the present disclosure is not limited to such examples.

On acquiring log information such as that illustrated in FIG. 7, the log information acquiring unit 131 stores history information relating to the time and date when the log information was acquired in the database in the storage unit 111 or the like and outputs the acquired log information to the information management unit 133, described below.

As one example, the information management unit 133 is realized by a CPU, a ROM, a RAM, and the like. The information management unit 133 refers to the log information acquired by the log information acquiring unit 131 and manages the content of a database (in more detail, the registered appliance information) registered in the storage unit 111. When doing so, the information management unit 133 manages the content of the database by associating such content with time/date information expressing the time and date when the log information was acquired. By doing so, the information management unit 133 is capable of grasping changes over time in the content written in the registered appliance information, and it becomes possible to provide information showing changes over time in the state of the power storage apparatus 20 to the user as necessary.

As one example, the information providing unit 135 is realized by a CPU, a ROM, a RAM, and the like. In accordance with an information disclosure request from a user operation terminal 9 operated by a user, the information providing unit 135 provides the managed registered appliance information to the user operation terminal 9 that made the request.

Although the information provided by the information providing unit 135 to the user operation terminal 9 may be set as appropriate, as examples it is possible to provide information that graphically shows the operation state of the power storage apparatus 20, information that shows the location of the power storage apparatus 20 on a map, setting conditions of the power storage apparatus 20, and the like. Note that because it is possible to display the location of the power storage apparatus 20 on a map using GPS information, when the power storage apparatus 20 has been stolen, it is also possible to display the present location and/or the movement route of the power storage apparatus 20 on a map.

When providing the registered appliance information, the information providing unit 135 should preferably convert the registered appliance information to be provided to a user operation terminal 9 to a data format that can be displayed by the user operation terminal 9 and then provide the converted information via the communication unit 103 to the user operation terminal 9.

For example, when the user operation terminal 9 is a device that is capable of using a Web browser, the information providing unit 135 converts the information to be provided to the user to a data format (for example, a format such as HTML or XML) that is capable of being displayed using a Web browser. When the applications that can be used by the user operation terminal 9 are limited, such as when the user operation terminal 9 is some type of mobile appliance or a car navigation system, the information providing unit 135 converts the data format of the information in accordance with the applications that can be used.

The information providing unit 135 is also capable of changing the content of the registered appliance information to be provided to the user operation terminal 9 in accordance with a user operation carried out on the user operation terminal 9.

Note that the information providing unit 135 is capable of providing information relating to a power storage apparatus 20 not only to a user operation terminal 9 but also to various types of server, such as a search server, or another information processing apparatus connected to the communication network 7. Although the information providing unit 135 is capable of selecting the information on the power storage apparatus 20 to be provided to another server or information processing terminal, as one example, by providing information expressing the installed position of the power storage apparatus 20, it becomes possible to confirm the installed state of the power storage apparatus 20 from an arbitrary server.

As one example, the control information generating unit 137 is realized by a CPU, a ROM, a RAM, and the like. When setting information relating to operation of a power storage apparatus 20 transmitted from a user operation terminal 9 has been stored in a specified location such as the storage unit 111, the control information generating unit 137 uses the stored setting information to generate control information for controlling the power storage apparatus 20. When a connection has been established with the power storage apparatus 20 in question using the mobile communication network 3, the control information generating unit 137 transmits the generated control information via the mobile communication unit 101 to the power storage apparatus 20.

There are no particular limitations on the type of control information generated by the control information generating unit 137 and such information may be set as appropriate. Note that because it is possible in the power storage apparatus management system 1 according to the present example embodiment for the information processing apparatus 10 to grasp information expressing the installed position of a power storage apparatus 20, by setting in advance a region in which the power storage apparatus 20 can operate, it would be conceivably possible to prevent theft of the power storage apparatus 20.

The control information generating unit 137 is capable of executing a generation process for control information for controlling the power storage apparatus 20 at arbitrary timing. As examples, the control information generating unit 137 may generate the control information when setting information is stored in a specified location and/or when a connection has been established with the power storage apparatus 20 in question.

Once the generated control information has been transmitted to the power storage apparatus 20 in question, the control information generating unit 137 should preferably request the information management unit 133 to update the content of the registered appliance information to a content in keeping with the control information.

This completes the detailed description of the functions of the power storage apparatus management unit 107 according to the present example embodiment with reference to FIGS. 6 and 7. The explanation will now return to FIG. 2 and describe the setting information acquiring unit 109 according to the present example embodiment in detail.

As one example, the setting information acquiring unit 109 is realized by a CPU, a ROM, a RAM, and the like. When a setting changing screen for a power storage apparatus 20 has been operated at a user operation terminal 9 that has been provided with information from the information providing unit 135 and the operation settings of the power storage apparatus 20 have been changed, the setting information acquiring unit 109 acquires setting conditions showing the changed operation settings from the user operation terminal 9. The setting information acquiring unit 109 stores the setting conditions acquired from the user operation terminal 9 as setting information in a specified location of the storage unit 111. When communication has been established with the power storage apparatus 20 in question using such setting information, the control information generating unit 137 of the power storage apparatus management unit 107 transmits control information generated based on the setting information to the power storage apparatus 20.

The storage unit 111 is one example of a storage apparatus provided in the information processing apparatus 10 according to the present example embodiment. Various databases, namely user information relating to users who use the power storage apparatus management system according to the present example embodiment and registered appliance information relating to power storage apparatuses connected to the power storage apparatus management system, are stored in the storage unit 111. Various history information may also be recorded in the storage unit 111. In addition, the information processing apparatus 10 according to the present example embodiment records various parameters that may need to be stored when carrying out some kind of processing, intermediate results of processing, various databases, programs, and the like as appropriate in the storage unit 111.

The storage unit 111 is capable of being freely read and written by the various processing units provided in the information processing apparatus 10.

One example of the functions of the information processing apparatus 10 according to the present example embodiment has been described above. The various component elements described above may be configured using general-purpose parts and circuits or may be configured using hardware that is dedicated to the functions of the respective component elements. Alternatively, the functions of the respective component elements may all be carried out by a CPU or the like. Accordingly, it is possible to change the configuration in use as appropriate in accordance with the prevailing technical level when implementing the present example embodiment.

Note that a computer program for realizing the functions of the information processing apparatus according to the above example embodiment may be created and installed in a personal computer or the like. It is also possible to provide a computer-readable recording medium on which such a computer program is stored. As examples, the recording medium may be a magnetic disk, an optical disc, a magneto-optical disc, or a flash memory. The computer program mentioned above may also be distributed via a network, for example, without using a recording medium.

Note that although the information processing apparatus 10 according to the present example embodiment has been described by way of an example where the flow that associates the power storage apparatuses 20 to users is carried out having first carried out a registration process relating to users who use the system, the present disclosure is not limited to this example. For example, users that are able to use the respective power storage apparatuses 20 may be associated with the power storage apparatuses 20 after the power storage apparatuses 20 to be managed have first been registered in the information processing apparatus 10 according to the present example embodiment.

In other words, in the information processing apparatus 10 according to the present example embodiment, so long as the power storage apparatuses 20 recorded in the information processing apparatus 10 and information relating to users that are able to carry out various operations on such power storage apparatuses 20 are correctly associated, such associating can be carried out according to any processing flow.

(1-3) Configuration of Power Storage Apparatus

Figure 8:
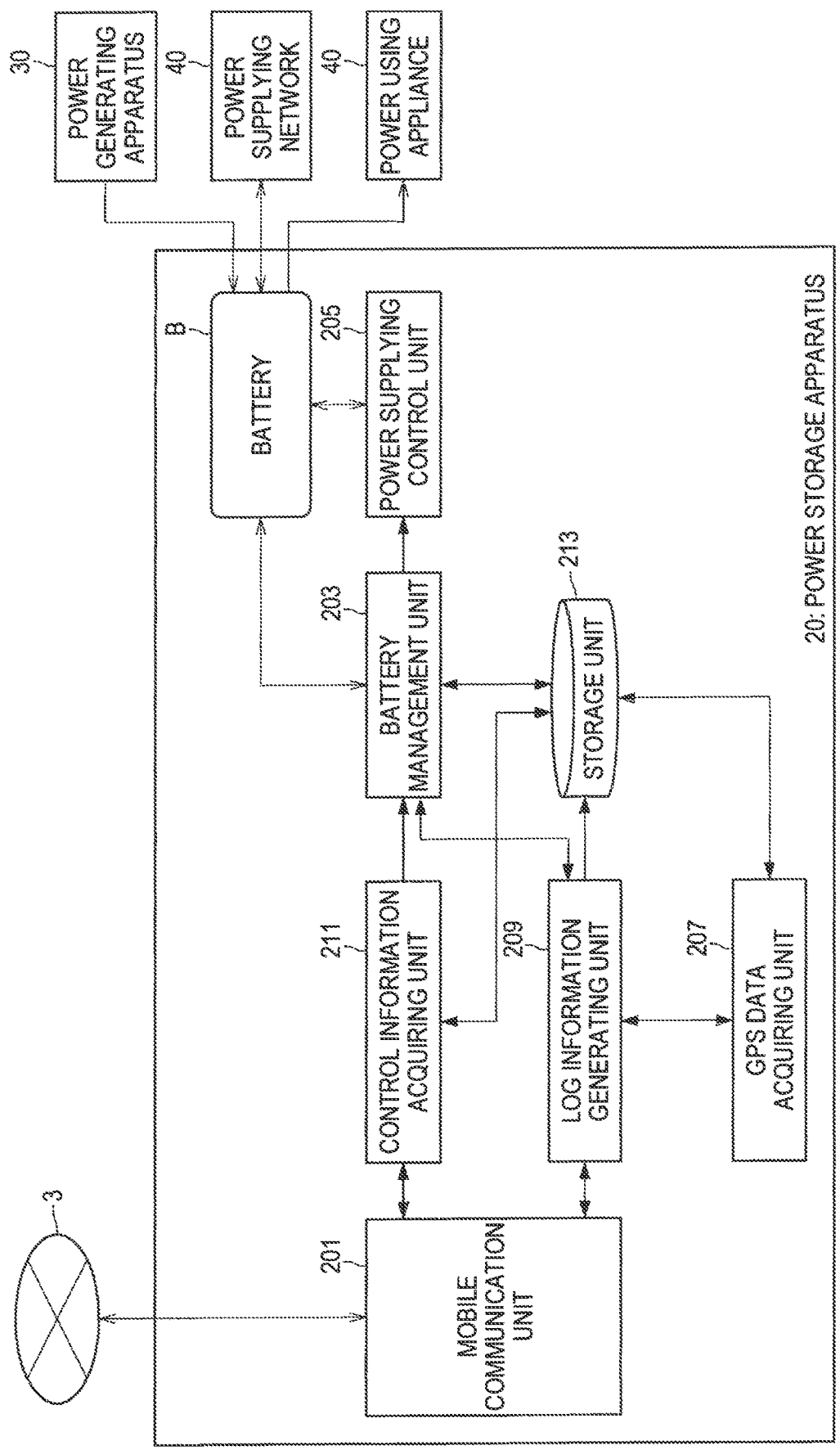
FIG. 8 is a block diagram illustrating an example of the configuration of a power storage apparatus according to the same example embodiment.

Next, the configuration of a power storage apparatus according to the present example embodiment will be described in brief with reference to FIG. 8. FIG. 8 is a block diagram showing the configuration of a power storage apparatus 20 according to the present example embodiment.

As shown in FIG. 8, the power storage apparatus 20 according to the present example embodiment mainly includes a battery B, a mobile communication unit 201, a battery management unit 203, a power supplying control unit 205, a GPS data acquiring unit 207, a log information generating unit 209, a control information acquiring unit 211, and a storage unit 213.

The battery B stores power generated by a power generating apparatus 30 and/or power supplied from the power supplying network 40 and supplies the stored power to a power using appliance 50, such as an electrical appliance or an electric vehicle. Although there are no particular limitations on the configuration of the battery B itself, as one example it is possible to use a lithium ion battery or the like as the battery 8.

The mobile communication unit 201 is realized by a CPU, a ROM, a RAM, a modem for communicating with the mobile communication network 3, and the like. The mobile communication unit 201 controls communication carried out between the power storage apparatus 20 and the information processing apparatus 10 via the mobile communication network 3. When the various processing units provided in the power storage apparatus 20 according to the present example embodiment exchange information with the information processing apparatus 10, such information is transmitted and received via the mobile communication unit 201.

Here, when the mobile communication unit 201 exchanges information with the information processing apparatus 10, a connection is established in a direction from the mobile communication unit 201 on the power storage apparatus 20 side toward the information processing apparatus 10 (that is, the mobile communication unit 201 on the power storage apparatus 20 side is the initiator). By doing so, the mobile communication unit 201 is capable of establishing a connection with the information processing apparatus 10 in a state that is suited to transmission of information by the power storage apparatus 20.

Note that as described earlier, the exchanging of information between the information processing apparatus 10 and the power storage apparatus 20 is carried out via the mobile communication network 3. For this reason, to suppress the number of transmitted packets and power usage required to transmit and receive information, the mobile communication unit 201 is capable of using various communication methods.

As one example, the battery management unit 203 is realized by a CPU, a ROM, a RAM, various sensors for grasping the state of the battery B, and the like. The battery management unit 203 monitors the state of the battery B provided in the power storage apparatus 20 and grasps the state of the battery B. The battery management unit 203 is capable of using information obtained by grasping the state of the battery B to grasp a drop in the functioning of the battery B, failure of the battery B, and the like. As examples, as the method of grasping a drop in the functioning of the battery B, failure of the battery B, and the like, it is possible to use a known method, such as a method that makes judgments using specified thresholds or a method that uses a discriminant function generated according to a heuristic method.

The battery management unit 203 outputs information obtained by grasping the state of the battery B to the log information generating unit 209, described later, to transmit the information to the information processing apparatus 10 according to the present example embodiment.

The battery management unit 203 also changes various setting information relating to operation of the power storage apparatus 20 in accordance with control information for the power storage apparatus 20 transmitted from the information processing apparatus 10.

In addition, the battery management unit 203 is capable of realizing various functions carried out to cause the power storage apparatus 20 to operate appropriately in addition to the functions described above.

As one example, the power supplying control unit 205 is realized by a CPU, a ROM, a RAM, and the like. The power supplying control unit 205 supplies power stored in the battery B to a power using appliance 50 such as an electrical appliance or an electrical vehicle in accordance with instructions from the battery management unit 203. If the selling of power stored in the power storage apparatus 20 is recognized, the power supplying control unit 205 is also capable of selling stored power via the power supplying network 40.

As one example, the GPS data acquiring unit 207 is realized by a CPU, a ROM, a RAM, various sensors for receiving GPS signals, and the like. By receiving a plurality of signals transmitted from GPS satellites, the GPS data acquiring unit 207 calculates position information showing the present position on the globe. The GPS data acquiring unit 207 outputs position information relating to the present position calculated based on signals transmitted from GPS satellites to the log information generating unit 209 as GPS data. Here, there are no particular limitations on the timing at which signals transmitted from GPS satellites are received and such reception can be carried out at arbitrary timing. As one example, the log information generating unit 209 is realized by a CPU, a ROM, a RAM, and the like. When the timing at which the log information is transmitted to the information processing apparatus 10 has been reached, the log information generating unit 209 generates the log information based on the various information acquired from the battery management unit 203 and the GPS data acquiring unit 207. The content of the generated log information is as shown in FIG. 7, for example. The log information generating unit 209 transmits the generated log information to the information processing apparatus 10 via the mobile communication unit 201.

Here, as the timing at which the log information generating unit 209 generates the log information, aside from when the power storage apparatus 20 is newly connected to the power storage apparatus management system 1, the following timing could conceivably be used.

Timing at which the log information is generated (aside from when newly connecting to the system)

whenever a specified period passes, such as one hour, one day, one week, or one month whenever the operation mode (such as power storing mode, discharging mode, and a stopped state) of the power storage apparatus changes whenever an unexpected situation arises (for example, when there has been an unforeseen change in the position information or an emergency situation such as a battery failure)

In addition to the situations described above, the log information generating unit 209 may generate log information in the situations listed below.

when the user has issued a short message or made a telephone call to the power storage apparatus 20 via the mobile communication network 3 when a short message has been issued or a telephone call has been made via the mobile communication network 3 to the power storage apparatus 20 from a modem or the like provided in the information processing apparatus 10 when the information processing apparatus 10 has issued an e-mail message or the like via the communication network 7 to the relay server 5 to request transmission of log information from the relay server 5

As one example, the control information acquiring unit 211 is realized by a CPU, a ROM, a RAM, and the like. The control information acquiring unit 211 enquires to the information processing apparatus 10 as to whether there is control information for the power storage apparatus 20 to which the control information acquiring unit 211 belongs, and acquires control information for controlling the power storage apparatus 20 that has been transmitted from the information processing apparatus 10 via the mobile communication network 3. The acquisition of control information is carried out when a connection has been established via the mobile communication network 3 for transmission of the log information generated by the log information generating unit 209 to the information processing apparatus 10.

On acquiring the control information transmitted from the information processing apparatus 10 via the mobile communication unit 201, the control information acquiring unit 211 outputs the acquired control information to the battery management unit 203. By carrying out operation control of the power storage apparatus 20 based on the control information outputted by the control information acquiring unit 211, the battery management unit 203 is capable of realizing the operation control over the power storage apparatus 20 intended by the user.

The storage unit 213 is one example of a storage apparatus provided in the power storage apparatus 20 according to the present example embodiment. Various information, such as the log information itself transmitted by the power storage apparatus 20 and history information relating to transmission of the log information, is stored in the storage unit 213. In addition, the power storage apparatus 20 according to the present example embodiment also records various parameters that may need to be stored when carrying out some kind of processing, intermediate results of processing, various databases, programs, and the like as appropriate in the storage unit 213.

The storage unit 213 is capable of being freely read and written by the various processing units provided in the power storage apparatus 20.

One example of the functions of the power storage apparatus 20 according to the present example embodiment has been described above. The various component elements described above may be configured using general-purpose parts and circuits or may be configured using hardware that is dedicated to the functions of the respective component elements. Alternatively, the functions of the respective component elements may all be carried out by a CPU or the like. Accordingly, it is possible to change the configuration in use as appropriate in accordance with the prevailing technical level when implementing the present example embodiment.

(1-4) Information Processing Method

Figure 9:
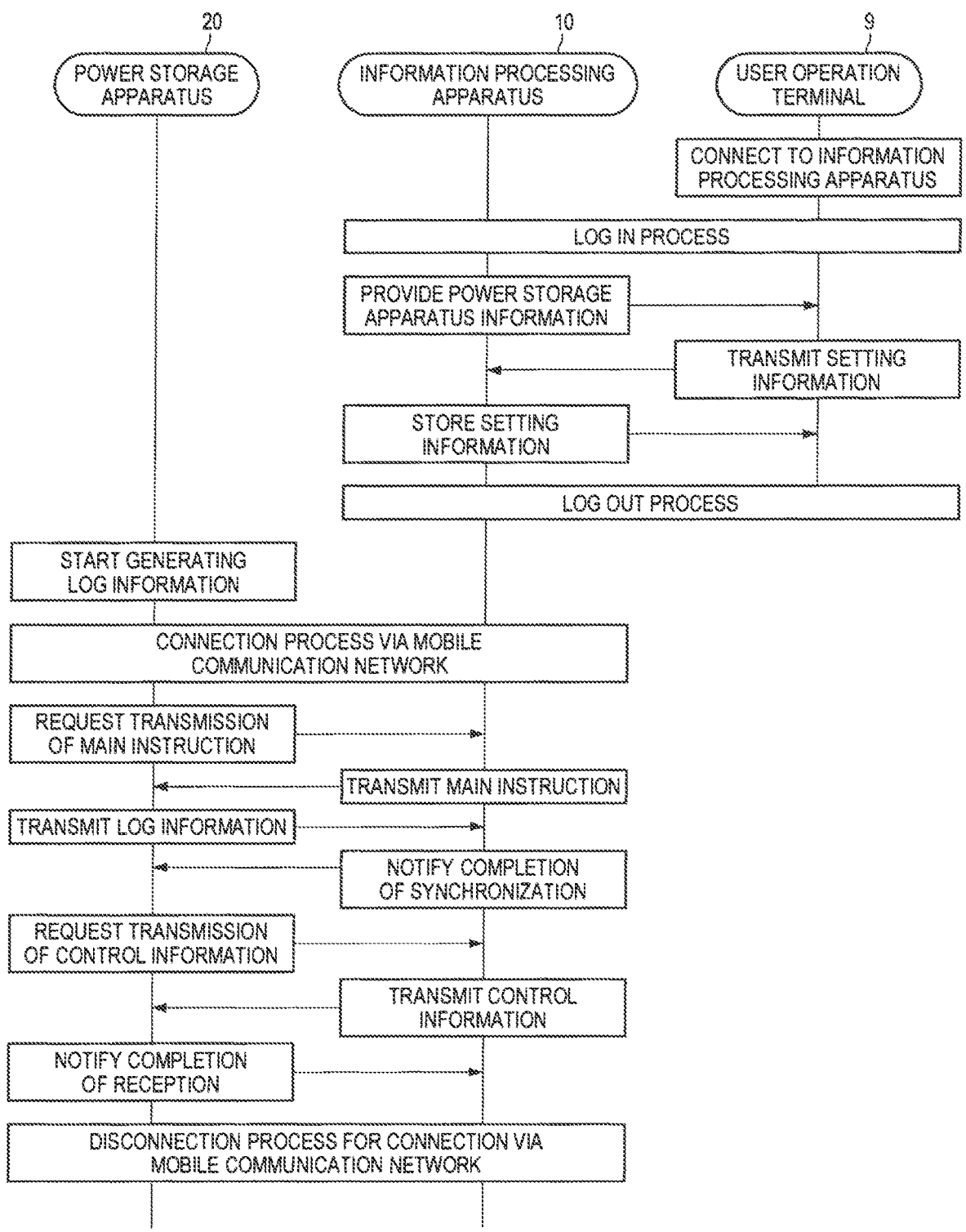
FIG. 9 is a flowchart illustrating the flow of an information processing method according to the same example embodiment.

Next, the flow of the information processing method according to the present example embodiment will be described in brief with reference to FIG. 9. FIG. 9 is a flowchart showing the flow of the information processing method according to the present example embodiment.

Note that it is assumed that user registration relating to users who use the power storage apparatus management system 1 according to the present example embodiment and appliance registration of the power storage apparatuses 20 connected to the power storage apparatus management system 1 have been completed before the following explanation begins.

When a user wishes to know the operation state of a power storage apparatus 20, the user operates a user operation terminal 9 the user has to cause the user operation terminal 9 to connect to the information processing apparatus 10 using an ordinary Internet connection or the like (step S101). At this time, a specified log-in process is implemented between the user operation terminal 9 and the information processing apparatus 10 (step S103). This log-in process may be a log-in process that is unique to the power storage apparatus management system 1 according to the present example embodiment or may use a log-in process for a public information providing server, an information searching server, or the like.

Once the log-in process is complete and the validity of the user operating the user operation terminal 9 has been confirmed, the information providing unit 135 of the information processing apparatus 10 refers to a database (the registered appliance information) stored in the storage unit 111. After this, the information providing unit 135 provides the power storage apparatus information for the power storage apparatus 20 whose operation state the user wishes to grasp to the user operation terminal 9 in a suitable format for the user operation terminal 9 (step S105).

Also, when the user has operated the user operation terminal 9 and changed the setting information that designates operation settings of the power storage apparatus 20, the user operation terminal 9 transmits the changed setting information to the information processing apparatus 10 (step S107). Once the setting information transmitted from the user operation terminal 9 has been acquired, the setting information acquiring unit 109 of the information processing apparatus 10 stores the acquired setting information in a specified location in the storage unit 111 or the like (step S109).

When the user has finished viewing the information relating to the power storage apparatus 20 currently in focus, the user operates the user operation terminal 9 and carries out a specified log out process (step S111). By doing so, the connection established between the user operation terminal 9 and the information processing apparatus 10 is released.

After this, in the power storage apparatus 20 connected to the power storage apparatus management system 1, when the timing for transmitting the log information to the information processing apparatus 10 has been reached, the log information generating unit 209 of the power storage apparatus 20 starts to generate the log information to be transmitted (step S121). When doing so, the log information generating unit 209 acquires information to be written in the log information, that is, information relating to the operation state of the battery when the log information is generated, from the battery management unit 203. The log information generating unit 209 also acquires GPS data (position information) expressing the present position of the power storage apparatus 20 from the GPS data acquiring unit 207. Based on such acquired information and setting information that sets what information is to be included in the log information, the log information generating unit 209 generates the log information to be transmitted to the information processing apparatus 10.

Also, in the power storage apparatus 20, when the log information generating unit 209 starts to generate the log information, the establishment of a connection via the mobile communication network 3 to be used for communication with the information processing apparatus 10 is commenced (step S123). The protocol used for communication with the information processing apparatus 10 can be decided as appropriate.

When a connection with the information processing apparatus 10 has been established, the power storage apparatus 20 requests the information processing apparatus 10 to transmit a main instruction (step S125). The power storage apparatus management unit 107 of the information processing apparatus 10 transmits a main instruction indicating the transmission of log information to the power storage apparatus 20 (step S127).

The log information generating unit 209 of the power storage apparatus 20 receives the main instruction transmitted from the information processing apparatus 10 (a main instruction indicating the transmission of log information) and transmits the generated log information to the information processing apparatus 10 (step S129).

When the acquisition of the log information transmitted from the power storage apparatus 20 has been completed, the log information acquiring unit 131 of the information processing apparatus 10 notifies the power storage apparatus 20 that synchronization of the log information has been completed (step S131). The information management unit 133 of the information processing apparatus 10 also updates the content of the registered appliance information stored in the storage unit 111 based on the acquired log information.

The control information acquiring unit 211 of the power storage apparatus 20 enquires to the information processing apparatus 10 as to whether there is control information for the power storage apparatus 20 to which the control information acquiring unit 211 belongs, and requests transmission of the control information when such control information exists (step S133). The power storage apparatus management unit 107 of the information processing apparatus 10 confirms whether control information exists for the power storage apparatus 20 with which a connection has been established and transmits the stored control information to the power storage apparatus 20 when such control information exists (step S135). When reception of the control information transmitted from the information processing apparatus 10 has been completed, the control information acquiring unit 211 of the power storage apparatus 20 notifies the information processing apparatus 10 that reception has been completed (step S137). The control information acquiring unit 211 outputs the received control information to the battery management unit 203. By doing so, it is possible for the battery management unit 203 to start control of the battery based on new control information.

On receiving notification that reception has been completed, the information processing apparatus 10 starts to disconnect the connection on the mobile communication network 3 that was established with the power storage apparatus 20 (step S139). By doing so, the connection on the mobile communication network 3 that was initiated from the power storage apparatus 20 side is released.

In this way, according to the information processing method according to the present example embodiment, by operating a user operation terminal 9, a user who is capable of referring to the state of a power storage apparatus 20 is able to confirm the state of such power storage apparatus 20 from any location and is also able to remotely operate the power storage apparatus 20.

In the power storage apparatus management system 1 according to the present example embodiment, communication between the information processing apparatus 10 and the power storage apparatus 20 is realized by a connection made via the mobile communication network 3. This means that control information for a power storage apparatus 20 set by a user operation is transmitted to such power storage apparatus 20 when a connection is established with the power storage apparatus 20. Meanwhile, because it is possible for the power storage apparatus 20 to acquire control information stored in the information processing apparatus 10 at the timing when log information is transmitted to the information processing apparatus 10, it is possible to suppress the amount of communicated data and consumed battery power required for communication without the connection with the information processing apparatus 10 having to be maintained.

Note that although the case where a connection via the mobile communication network 3 is initiated from the power storage apparatus 20 to the information processing apparatus 10 has been described above, the connection via the mobile communication network 3 may be initiated from the information processing apparatus 10 side.

(1-5) Examples of Information Providing Screens

Next, examples of information providing screens provided by the information processing apparatus 10 according to the present example embodiment will be described with reference to FIGS. 10 to 15. FIGS. 10 to 15 are diagrams useful in showing examples of the information providing screens provided by the information processing apparatus 10 according to the present example embodiment.

When a user of the power storage apparatus management system 1 operates a user operation terminal 9 and connects to the information processing apparatus 10, a display screen ("information providing screen") such as that shown in FIG.

10 for example is displayed on a display unit, such as a display, of the user operation terminal 9.

As shown in FIG. 10, information relating to a power storage apparatus 20 for which the user has the authority to view information is written in the information providing screen. In the information providing screen shown in FIG. 10, a region that displays a list of latest reports, a region in which latest operation reports relating to power storage apparatuses whose operation states have changed is displayed, and a region in which other announcements to the user are displayed are formed. As examples of such announcements to the user, in FIG. 10, a "notifications" column in which information relating to a power storage apparatus whose position information has changed and information relating to a power storage apparatus in an emergency state is given and a "messages" column that displays ordinary messages to the user are provided.

Aside from such display regions, the information providing screen is also provided with a display region that displays a location of the power storage apparatus based on GPS data, a display region for images taken by webcams mounted on the power storage apparatus, and a display region for comments made by users relating to the power storage apparatus. As one example, maintenance information and the like relating to the power storage apparatus 20 is displayed in the display region for comments.

By referring to such an information providing screen, the user can easily grasp information relating to a power storage apparatus 20 over which the user has authority at timing desired by the user.

Figure 11:
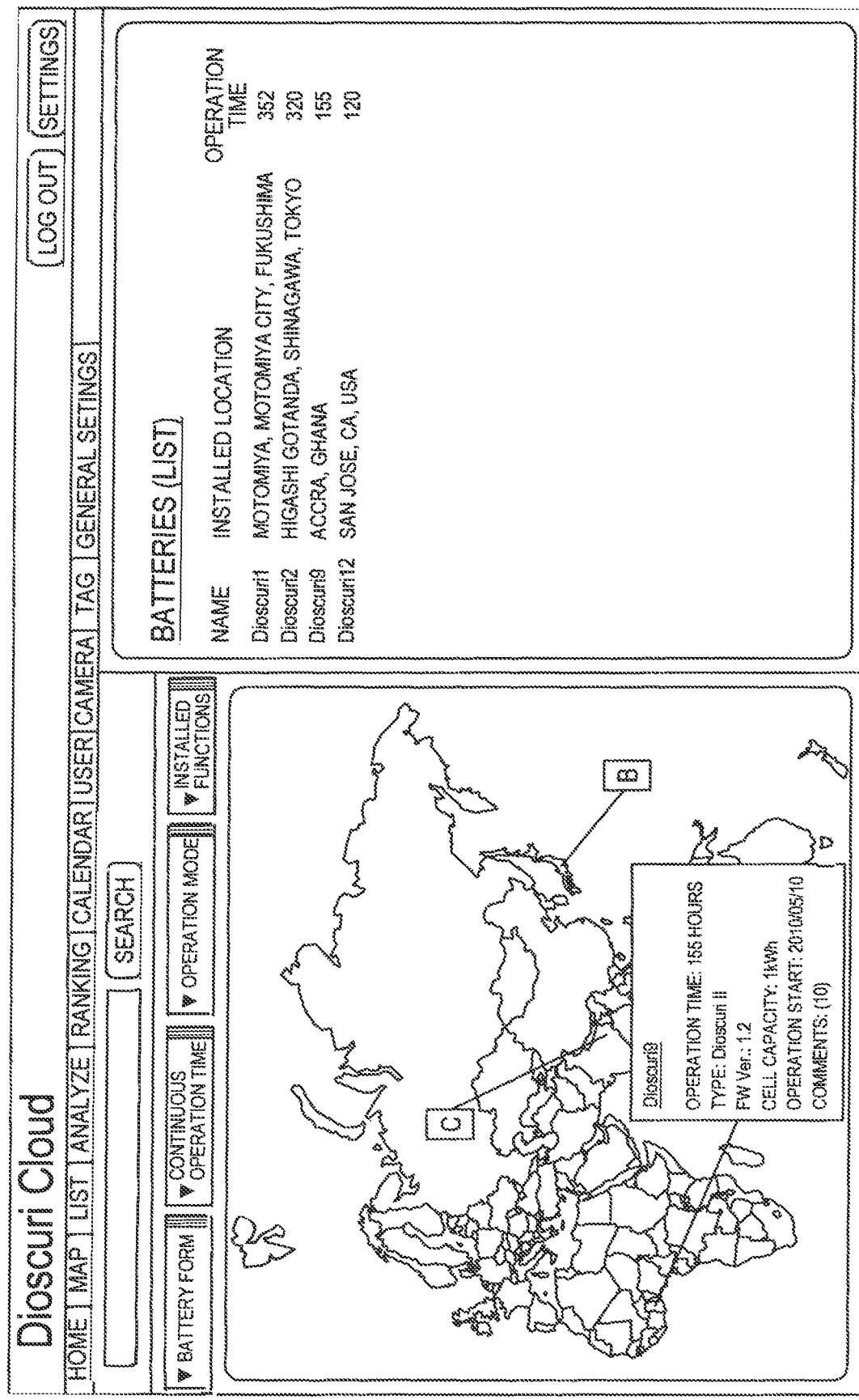
FIG. 11 is a diagram illustrating another example of an information providing screen according to the same example embodiment.

By operating the user operation terminal 9, the user is capable of having a display screen such as that shown in FIG. 11 displayed. The information providing screen shown in FIG. 11 illustrates the locations of power storage apparatuses 20 on a map, and by selecting a flag on the map, it is possible to have the detailed specification of the selected power storage apparatus 20 displayed. By setting conditions such as the battery form, the continuous operation time, the operation mode, and the installed functions, the user can select only power storage apparatuses that match the set conditions and have such power storage apparatuses displayed.

In addition, by operating the user operation terminal 9, the user is capable of having a display screen such as that shown in FIG. 12 displayed. An information providing screen that is mainly text like the screen shown in FIG. 12 is effective in providing information when the user operation terminal 9 is an apparatus that is suited to displaying mainly text, such as a mobile telephone or an electronic book reader.

Figure 13:
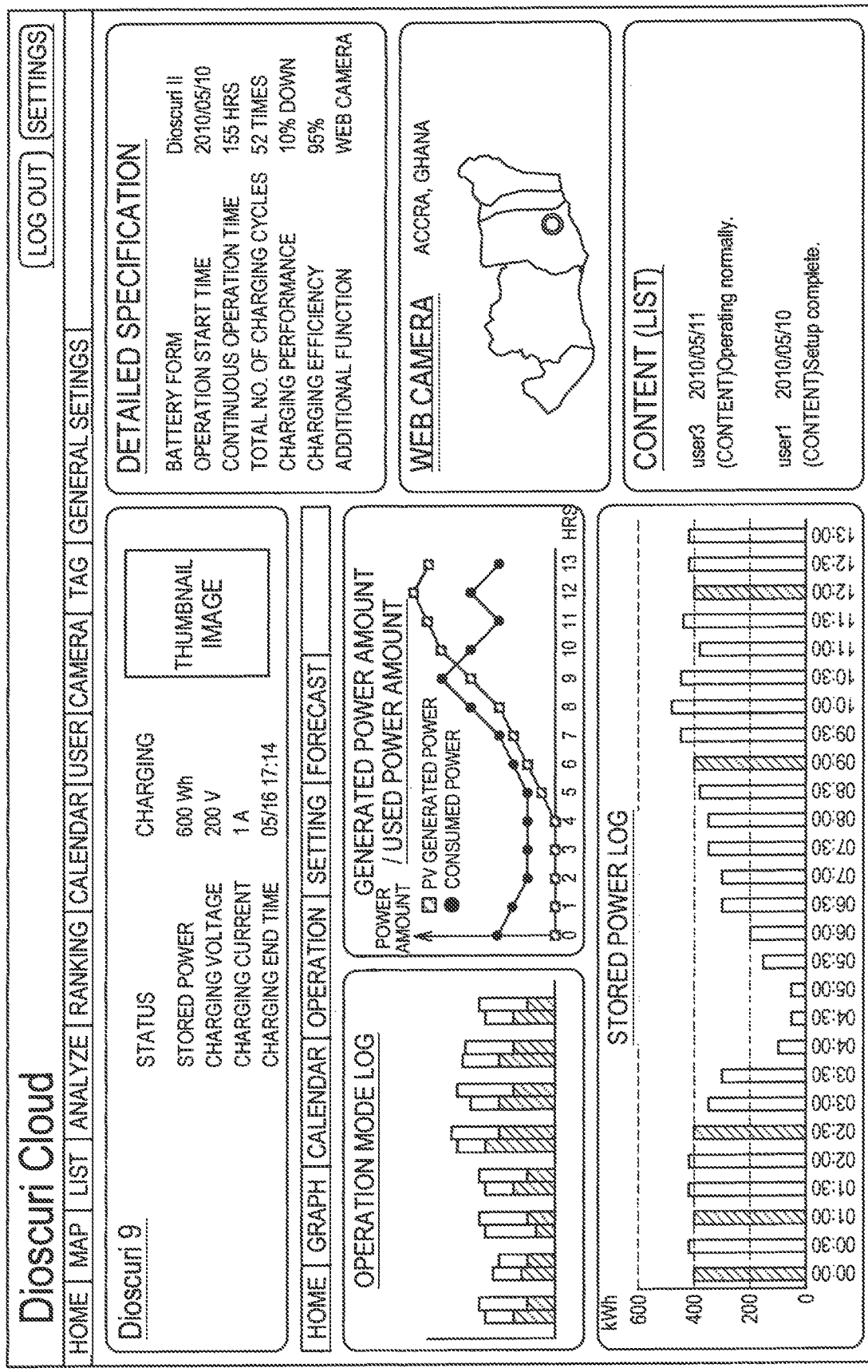
FIG. 13 is a diagram illustrating another example of an information providing screen according to the same example embodiment.

By operating the user operation terminal 9, the user is also capable of having an information providing screen such as that shown in FIG. 13 displayed. FIG. 13 is one example of an information providing screen displayed when the user has selected a given power storage apparatus 20. As shown in FIG. 13, when a given power storage apparatus has been selected, the detailed specification of the selected power storage apparatus, log information expressing changes in the operation mode, log information expressing changes in the amount of generated power and the amount of used power, and log information expressing changes in the amount of stored power are displayed in respective display regions. Here, information, such as the log information expressing changes in the amount of generated power and the amount of used power, where graphical representation is effective in enabling the user to grasp the information is displayed in graphical form as shown in FIG. 13. By referring to this type of display screen, the user is able to easily grasp the operation state of a specified power storage apparatus.

This information providing screen is generated on the user operation terminal 9 mainly by the functioning of the power storage apparatus management unit 107 (in more detail, by the information providing unit 135) of the information processing apparatus 10.

Figure 14:
FIG. 14 is a diagram illustrating another example of an information providing screen according to the same example embodiment.

By operating the user operation terminal 9 and having a setting screen such as that shown in FIG. 14 displayed, the user is also capable of carrying out operation control over a power storage apparatus 20 from a remote location. The setting screen shown in FIG. 14 is provided with a display region in which operation contents for operating the power storage apparatus from a remote location are displayed, a display region in which contents for carrying out maintenance on the power storage apparatus are displayed, and a display region in which contents for setting an operation during an emergency are displayed.

For example, by operating the display region in which operation contents for operating the power storage apparatus from a remote location are displayed, the user is capable of realizing a remote operation over the power storage apparatus. In the example shown in FIG. 14, operations such as switching the power of the power storage apparatus itself on and off, setting the supplying of power to a power using appliance connected to the power storage apparatus, on/off switching of a charging operation or power supplying operation, and changing the power supplying method (switching between DC and AC, setting current and voltage values, and the like) can be realized.

Also, in the display region in which contents for carrying out maintenance are displayed, it is possible to indicate rebooting the power storage apparatus, a start of a self-diagnosis process for the power storage apparatus, an update process for various software that runs on the power storage apparatus, and the like.

In addition, in the display region for setting operations during an emergency, it is possible to indicate an emergency halting of the power storage apparatus and make settings as to whether to implement an anti-theft mode, such as whether to sound a siren when the power storage apparatus is stolen.

Figure 15:
FIG. 15 is a diagram illustrating another example of an information providing screen according to the same example embodiment.

By operating the user operation terminal 9 and having a setting screen such as that shown in FIG. 15 displayed, the user is also capable of changing the settings themselves of the power storage apparatus 20 from a remote location. The setting screen shown in FIG. 15 is provided with a display region for setting the frequency of transmission of log information (i.e., reports) to the information processing apparatus 10, a display region for selecting the various information included in the log information (reports), a display region for setting events, a display region for setting an operation schedule, and a display region for setting measures to be taken when the power storage apparatus is stolen.

By operating the display region for setting the frequency for transmitting log information, the user is able to set the frequency for transmitting log information to the information processing apparatus 10. By operating the display region for selecting the various information included in the log information, the user is able to set the content of the log information transmitted by a power storage apparatus (and moreover, the content of the information that can be confirmed by the user himself/herself in an information providing screen). By changing such contents, the user is able to freely customize the amount of transmitted information and consumed battery power relating to the transmission of log information.

Also, by operating the display region for setting events, it is possible to change the event settings, i.e., in what situations the log information is transmitted. By operating the display region for setting the operation schedule, the user is able to set an operation schedule, i.e., a time period during the day where the charging (or discharging) is to be carried out. By operating the display region for setting measures to be taken when the power storage apparatus is stolen, the user is able to make a setting of in what situations the operation of the power storage apparatus is to stop automatically and a setting of in what situations an alert (warning) is to be issued.

The setting screen shown in FIG. 14 and FIG. 15 are generated on the user operation terminal 9 mainly by the functioning of the power storage apparatus management unit 107 (in more detail, by the information providing unit 135) of the information processing apparatus 10. Information showing the content set in such setting screens is acquired by the setting information acquiring unit 109 of the information processing apparatus 10 and is outputted to the control information generating unit 137.

This completes the description of the information providing screens provided by the information processing apparatus 10 according to the present example embodiment with reference to FIGS. 10 to 15.

(2) Hardware Configuration

Next, the hardware configuration of the information processing apparatus 10 according to the example embodiment of the present disclosure will be described in detail with reference to FIG. 16. FIG. 16 is a block diagram for illustrating the hardware configuration of the information processing apparatus 10 according to the example embodiment of the present disclosure.

The information processing apparatus 10 mainly includes a CPU 901, a ROM 903, and a RAM 905. Furthermore, the information processing apparatus 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processing performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE 1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the example embodiment of the present disclosure has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present example embodiment.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The present disclosure contains subject matter related to that disclosed in Japanese Priority Patent Application JP 2010-120921 filed in the Japan Patent Office on May 26, 2010, the entire content of which is hereby incorporated by reference.

The invention claimed is:

1. A power storage management system, comprising:
   a power storage apparatus that stores:
      first information indicative of a position of the power storage apparatus, and
      second information indicative of an operation state of the power storage apparatus, and
      captured images; and
   an information processing apparatus configured to communicate with the power storage apparatus to acquire the first information, the second information and the captured images from the power storage apparatus,
   wherein the second information includes information relating to a stored amount of power in the power storage apparatus.

2. The power storage management system of claim 1, wherein
   the information processing apparatus is further configured to communicate with the power storage apparatus via wireless communications.

3. The power storage management system of claim 1, wherein the power storage apparatus is further configured to:
   acquire power from at least one of a power generating apparatus or a power supplying network, and
   supply the acquired power to an appliance.

4. The power storage management system of claim 1, wherein the information processing apparatus includes a mobile telephone.

5. The power storage management system of claim 1, wherein the information processing apparatus is configured to communicate with the power storage apparatus at least partially via the Internet.

6. The power storage management system of claim 1, wherein
   the power storage apparatus also stores first power storage apparatus information; and
   the information processing apparatus is configured to display the first power storage apparatus information.

7. The power storage management system of claim 1, wherein
   the power storage apparatus stores first power storage apparatus information,
   the power storage apparatus operates in association with an operation state, and
   the power storage apparatus is further configured to provide the first power storage apparatus information to the information processing apparatus based on a change in the operation state of the power storage apparatus.

8. The power storage management system of claim 1, wherein
   the power storage apparatus stores first power storage apparatus information, and
   the power storage apparatus is further configured to
      determine whether a predetermined situation has occurred, and
      provide the first power storage apparatus information to the information processing apparatus in response to a determination that the predetermined situation has occurred.

9. An information processing apparatus, comprising:
   a processor;
   a non-transitory memory having instructions stored therein that when executed by the processor cause the processor to
      communicate with a power storage apparatus, wherein the power storage apparatus stores first information indicative of a position of the power storage apparatus, second information indicative of an operation state of the power storage apparatus, and captured images, and
      acquire the first information, the second information and the captured images from the power storage apparatus,
      wherein the second information includes information relating to a stored amount of power in the power storage apparatus.

10. The information processing apparatus of claim 9, wherein the processor is further configured to communicate with the power storage apparatus via wireless communications.

11. The information processing apparatus of claim 9, wherein the processor is further configured to communicate with the power storage apparatus at least partially via the Internet.

12. The information processing apparatus of claim 9, wherein the processor is further configured to cause a display to display the present location or movement route of the power storage apparatus.

13. The information processing apparatus of claim 12, wherein the present location or movement route of the power storage apparatus is displayed on a map.

14. The information processing apparatus of claim 9, wherein
   the power storage apparatus stores first power storage apparatus information, and the processor is configured to cause a display to display the first power storage apparatus information.

15. A power storage apparatus, comprising:
a processor;
a non-transitory memory having instructions stored therein that when executed by the processor cause the processor to
communicate with an information processing apparatus, wherein the power storage apparatus stores first information indicative of a position of the power storage apparatus, second information indicative of an operation state of the power storage apparatus, and captured images, and
provide the first information, the second information, and the captured images from the power storage apparatus.

16. The power storage apparatus of claim 15, where the processor is further configured to communicate with the information processing apparatus via wireless communications.

17. The power storage apparatus of claim 15, wherein the processor is further configured to communicate with the information processing apparatus at least partially via the Internet.

18. The power storage apparatus of claim 15, wherein the processor is further configured to communicate with the information processing apparatus using a unique ID.

19. The power storage apparatus of claim 15, wherein the processor is further configured to receive control information from the information processing apparatus and to operate based on the control information.

20. The power storage apparatus of claim 15, wherein the second information indicative of an operation state of the power storage apparatus is at least one of power storing mode, discharging mode, and a stopped state.

21. The power storage apparatus of claim 15, wherein the processor is further configured to:
acquire power from at least one of a power generating apparatus or a power supplying network; and
supply the acquired power to an appliance.

22. The power storage apparatus of claim 15, wherein
the power storage apparatus stores first power storage apparatus information,
the power storage apparatus operates in association with an operation state, and
the processor is further configured to provide the first power storage apparatus information to the information processing apparatus based on a change in the operation state of the power storage apparatus.

23. The power storage apparatus of claim 15, wherein
the power storage apparatus stores first power storage apparatus information, and
the processor is further configured to
determine whether a specific situation has occurred, and
provide the first power storage apparatus information to the information processing apparatus in response to a determination that the specific situation has occurred.

24. A method, comprising:
in an information processing apparatus:
communicate with a power storage apparatus to acquire first information, second information, and captured images from the power storage apparatus,
wherein the first information is indicative of a position of the power storage apparatus and the second information is indicative of an operation state of the power storage apparatus, and
wherein the second information includes information relating to a stored amount of power in the power storage apparatus.

* * * * *